# skipping detailed rendering

2,917,382

SEPARATION OF PLUTONIUM FROM URANIUM

Harold M. Feder, Park Forest, and Ralph L. Nuttall, Downers Grove, Ill., assignors to the United States of America as represented by the United States Atomic Energy Commission No Drawing. Application August 14, 1957
Serial No. 678,251

8 Claims. (Cl. 75—84.1)

This invention deals with a process of separating plutonium from neutron-irradiated uranium.

It has been proposed heretofore to separate plutonium from neutron-irradiated uranium by melting the uranium, mixing the liquid uranium with molten magnesium, and then separating the magnesium which contained the bulk of the plutonium from the liquid uranium. This method, however, showed certain disadvantages. The liquid uranium is highly reactive and therefore attacks most of the container materials at the high temperature necessary for maintaining the uranium in the liquid phase. Consequently, the uranium becomes contaminated with the container material. Also, there are only very few materials which are resistant enough to the liquid uranium and thus are suitable for the process. Phase separation was found to be rather difficult and relatively incomplete, because the interface between the magnesium layer and the radioactive uranium layer had to be determined by remote control.

It is an object of this invention to provide a process for the separation of plutonium from neutron-irradiated uranium in which all of the above-listed disadvantages are overcome.

It is thus an object of this invention to provide a process for the separation of plutonium from neutron-irradiated uranium which can be carried out at a comparatively low temperature so that many materials are available for the equipment in which the process is to be carried out.

It is furthermore an object of this invention to provide a process for the separation of plutonium from neutron-irradiated uranium in which there is no attack of the container and no contamination of the uranium by the container material.

Finally it is also an object of this invention to provide a process of extracting neutron-irradiated uranium with liquid magnesium, whereby contact of the phases over an enlarged surface area and thus improved extraction is obtained.

These objects are accomplished by powdering the plutonium-containing uranium; contacting the powder with molten magnesium metal whereby the plutonium is taken up by the magnesium; and separating the liquid magnesium from the uranium powder.

Leaving the uranium in powder form brings about a more quantitative separation than is obtained from molten uranium, because, in the first place, of course, a solid can be removed from a liquid phase more easily than is possible for the separation of two liquid phases, but also, because the solubility of uranium in magnesium and that of magnesium in uranium are relatively low. It was found that uranium dissolves in magnesium to an amount of between 0.1 and 0.2 percent by weight at a temperature between 1000 and 1400° C., and that the solubility of magnesium in uranium at about 1150° C. is approximately 0.004 percent by weight. Separation of the magnesium from the uranium powder can be carried out by any means known to those skilled in the art; filtration with a sintered metallic filter, e.g., of stainless steel, was very satisfactory.

Powdering of the metallic uranium containing the plutonium can be carried out by hydriding as is known to those skilled in the art. Hydriding is best accomplished by heating the uranium in a hydrogen atmosphere at a temperature of about 225° C.; the hydride crumbles off the metallic uranium in the form of a powder as it is formed so that mechanical powdering is not necessary. The hydride powder may then be decomposed by heating it in the hydrogen atmosphere at a temperature between 350 and 400° C.

Instead of decomposing the uranium and plutonium hydride powder prior to contacting it with the liquid magnesium, the hydride powder can also be introduced as such into the liquid magnesium and decomposed there in situ. In fact, this embodiment is preferred, because certain advantages are accomplished thereby. The hydrogen which develops agitates the liquid magnesium so that stirring by mechanical means becomes unnecessary, and it also prevents agglomeration and sintering of the uranium powder.

The temperature of the liquid magnesium has to be held between 700 and 800° C. This temperature is critical because it is important that the uranium powder does not melt. Contact of the magnesium with the uranium material for about ten minutes at this temperature was found to be sufficient. The magnesium not only extracts the plutonium, but it also removes a great many rare earth metals, palladium, and other fission products from the uranium.

For recovery of the extracted values from the magnesium, volatilization of the magnesium was found to be the most satisfactory method. This volatilization was preferably carried out under reduced pressure so that a lower temperature could be used and attack of the equipment material could be minimized. A temperature of about 725° C., corresponding to a magnesium vapor pressure of 10 mm. Hg, was the optimum condition for this step. The magnesium could then be condensed under atmospheric pressure at a temperature of about 680° C.

Many materials were found suitable for the equipment for carrying out the extraction of plutonium and some fission products from the uranium at between 700 and 800° C. Vessels of cast iron, low-carbon steel, and high-chromium steel were found suitable. Chromium-nickel-containing stainless steel as a rule were found unsuitable, because nickel is soluble in magnesium so that the steel is attacked during the process; however, stainless steel type No. 347, which is niobium-stabilized steel containing about 18 percent chromium and 8 percent nickel is not wetted and attacked by magnesium and therefore satisfactory. Other materials applicable are tantalum, titanium, niobium, molybdenum and chromium metals, and also beryllia, calcium oxide, thoria, urania and zirconia. For the vaporization of the magnesium the preferred material was alumina.

In the following, a few examples will be given to illustrate the process of this invention. In these examples, the analyses of the various samples were obtained by removing portions of the uranium-magnesium mixtures through a filter and then analyzing the filtrates as well as the unfiltered residues. Likewise, a slice or other sample of the untreated irradiated uranium was analyzed in each case to ascertain the composition of the "charge."

Example 1

A 36-gram slice of a uranium slug, which contained about 72 p.p.m. of plutonium, was powdered by hydriding followed by decomposition of the hydride as set forth above. The uranium powder was then suspended in 70 grams of magnesium at 700° C. and maintained therein for three hours. Analyses of the magnesium phase obtained thereby showed that about 80 percent of the plutonium originally present had been extracted into the magnesium. The latter also was found to contain all of the cerium present in the uranium.

Example II

Neutron-irradiated uranium containing fission product elements was converted to a powder by two hydriding-dehydriding cycles. The powder was then suspended in liquid magnesium of 800° C. by mechanical stirring. The uranium contained 72 p.p.m. of plutonium. The extraction results are compiled in the table below.

| Run No. | 1 | | 2 | | | 3 | | | 4 | |
|---|---|---|---|---|---|---|---|---|---|---|
| Charge: | | | | | | | | | | |
| Slug | 36.13 g. | | 25.09 g. | | | 22.09 g. | | | 19.11 g. | |
| Mg | 70.40 g. | | 34.20 g. | | | 32.26 g. | | | 31.28 g. | |
| Time | 3 hrs. | | 3 hrs. | 5½ hrs. | | 10 min. | 2 hrs. | | 15 min. | |
| | Percent in Mg. | Mat. Bal.[1] | Percent in Mg. | Percent in Mg. | Mat. Bal.[1] | Percent in Mg. | Percent in Mg. | Mat. Bal.[1] | Percent in Mg. | Mat. Bal.[1] |
| U | 0.02 | 100 | 0.07 | 0.04 | 103 | 0.2 | 0.4 | 97 | 0.02 | 98 |
| Pu | 89 | 90 | 83 | 75 | 93 | 72 | 87 | 91 | 54 | 89 |
| β | 71 | 93 | 67 | 63 | 97 | 51 | 63 | 90 | 27 | 103 |
| γ | 16 | 85 | 12 | 11 | 98 | 10 | 13 | 91 | 0.2 | 89 |
| Ce | 78 | 134 | | | | 95 | 105 | 88 | 50 | 91 |
| TRE [2] | | | 85 | 97 | 108 | | | | | |
| Sr | 33 | 88 | 29 | 30 | 100 | 9 | 23 | 102 | 0.9 | 99 |
| Ru | 0.06 | 116 | 0.4 | 0.3 | 120 | 0.7 | 1.1 | 97 | 1.3 | 81 |
| Cs | 0.2 | 89 | 0.08 | 0.06 | 104 | 0.1 | 0.4 | 92 | 0.2 | 83 |

[1] Mat. Bal.=Material Balance=$100 \cdot \frac{\text{activity in filtration residue} + \text{activity in filtrate}}{\text{activity in charge}}$

[2] TRE=Total Rare Earths.

It is obvious from the above data that the extraction of a large fraction of the plutonium and rare earth activities proceeds very rapidly with the exception of that of strontium and cesium. It is possible that the readily extractable elements have migrated to grain boundaries as a result of low-temperature hydriding-dehydriding cycles and so are more easily available to the magnesium solvent. More than one-half of the plutonium was found to be extracted in ten minutes, a longer contact then increasing the plutonium extraction to approximately 90 percent.

The next example illustrates the uranium recovery from an alloy containing plutonium in macro-amounts.

Example III

A piece of a uranium-base alloy weighing 51.102 grams, one percent by weight of which was plutonium, was hydrided, and the powder was then heated while in contact with 10.470 grams of magnesium at 800° C. for one hour. The amount of plutonium extracted into the magnesium was found to be 48 percent in regard to the quantity originally present, while only 0.001 percent of the uranium was extracted.

It will be understood that this invention is not to be limited to the details given herein but that it may be modified within the scope of the appended claims.

What is claimed is:

1. A process of extracting plutonium values from a uranium metal comprising contacting powdered uranium metal containing plutonium with molten magnesium while keeping the uranium metal in solid form whereby the plutonium is taken up by said magnesium; and separating the molten magnesium containing said plutonium from the solid uranium metal.

2. The process of claim 1 wherein uranium powder is made from uranium metal by heating the metal to about 225° C. in a hydrogen atmosphere and then decomposing the hydride thus formed by heating to between 350 and 400° C. also in a hydrogen atmosphere.

3. The process of claim 1 wherein contacting is carried out by dispersing the uranium material powder in the molten magnesium.

4. The process of claim 1 wherein the molten magnesium has a temperature of between 700 and 800° C.

5. The process of claim 1 wherein the magnesium, after contacting, is separated from the uranium material by filtration.

6. The process of claim 1 wherein the plutonium-containing magnesium is subjected to heating under reduced pressure for volatilization of the magnesium and purification of the plutonium.

7. The process of claim 6 wherein the volatilization temperature is about 725° C.

8. A process of removing plutonium from neutron-irradiated uranium metal comprising heating said uranium metal at about 225° C. in a hydrogen atmosphere whereby powdered uranium hydride is formed, incorporating said uranium hydride into molten magnesium having a temperature of between 700 and 800° C. whereby the hydride is decomposed to metallic powdered uranium and the plutonium contained in said uranium is taken up by said magnesium; and separating said plutonium-containing magnesium from the uranium powder by filtration.

References Cited in the file of this patent

UNITED STATES PATENTS 2,778,730   Spedding _____ Jan. 27, 1957

OTHER REFERENCES

International Conf. on Peaceful Uses of Atomic Energy, 1955, vol. 9, page 581.